US012523225B2

(12) United States Patent
Busch et al.

(10) Patent No.: US 12,523,225 B2
(45) Date of Patent: Jan. 13, 2026

(54) REFRIGERANT COMPRESSOR WITH A MOTOR ROTOR AND STATOR SEPARATED BY A SEPARATING CAN

(71) Applicant: OET GMBH, Lustenau (AT)

(72) Inventors: Christian Busch, Feldkirch (AT); Christian Schmälzle, Lauterach (AT)

(73) Assignee: OET GMBH, Lustenau (AT)

( * ) Notice: Subject to any disclaimer, the term of this patent is extended or adjusted under 35 U.S.C. 154(b) by 0 days.

(21) Appl. No.: 18/722,493

(22) PCT Filed: Nov. 11, 2022

(86) PCT No.: PCT/EP2022/081662
§ 371 (c)(1),
(2) Date: Jun. 20, 2024

(87) PCT Pub. No.: WO2023/117210
PCT Pub. Date: Jun. 29, 2023

(65) Prior Publication Data
US 2025/0059975 A1 Feb. 20, 2025

(30) Foreign Application Priority Data

Dec. 22, 2021 (DE) .................. 10 2021 134 268.6

(51) Int. Cl.
F04C 29/00 (2006.01)
F04B 35/04 (2006.01)
(Continued)

(52) U.S. Cl.
CPC .......... F04C 29/0085 (2013.01); F04B 35/04 (2013.01); F04C 27/008 (2013.01);
(Continued)

(58) Field of Classification Search
CPC .......... H02K 5/128–136; F04C 18/0207–0292
See application file for complete search history.

(56) References Cited

U.S. PATENT DOCUMENTS 5,653,125 A    8/1997  Boyanich
6,365,998 B1 *  4/2002  Kech ................ H02K 3/47
                                                  310/194
(Continued)

FOREIGN PATENT DOCUMENTS

AT              275 U1 *  6/1995  ............... F16J 15/50
CN         103206385 A   7/2013
(Continued)

OTHER PUBLICATIONS

International Search Report issued in PCT/EP2022/081662 (Feb. 23, 2023).

Primary Examiner — Laert Dounis
(74) Attorney, Agent, or Firm — Merchant & Gould P.C.

(57) ABSTRACT

The invention relates to a refrigerant compressor for mobile applications, having a compressor section and a motor section, wherein variable compression chambers are formed in the compressor section in order to receive and compress a refrigerant flowing through a working medium circuit, and wherein a brushless electric motor is arranged in the motor section, which comprises a stator and a rotor which is drive-connected to the compressor section. The invention is characterized in that the stator and the rotor are separated from one another in a fluid-tight and/or gas-tight manner by a separating can.

14 Claims, 2 Drawing Sheets

Figure 1:
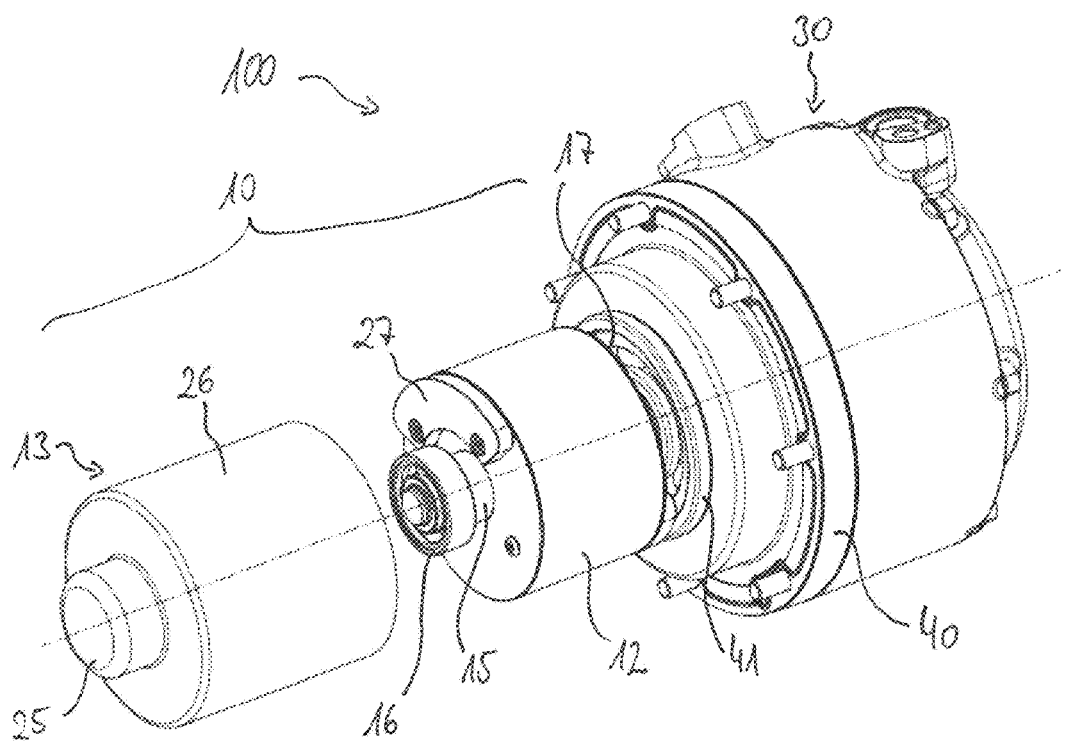

(51) Int. Cl.
  *F04C 18/02* (2006.01)
  *F04C 27/00* (2006.01)
  *F04C 29/04* (2006.01)
  *H02K 5/128* (2006.01)
  *H02K 7/14* (2006.01)

(52) U.S. Cl.
  CPC ........... *F04C 29/045* (2013.01); *H02K 5/128* (2013.01); *H02K 7/14* (2013.01); *F04C 18/0215* (2013.01); *F04C 2240/30* (2013.01); *F04C 2240/40* (2013.01)

(56) References Cited

U.S. PATENT DOCUMENTS

| | | | | |
|---|---|---|---|---|
| 2011/0256007 | A1* | 10/2011 | Shaffer | F04C 18/0215 418/5 |
| 2020/0025201 | A1* | 1/2020 | Mesward | F04C 18/0215 |
| 2022/0235772 | A1* | 7/2022 | Carboneri | H02K 5/128 |

FOREIGN PATENT DOCUMENTS

| | | | | | |
|---|---|---|---|---|---|
| CN | 106164493 | A | * | 11/2016 | ............... F01P 3/20 |
| CN | 115622277 | A | * | 1/2023 | ............... H02K 1/22 |
| EP | 0987811 | A2 | * | 3/2000 | ............... H02K 3/522 |
| EP | 3163087 | A1 | * | 5/2017 | ............... H02K 5/22 |
| GB | 271838 | A | | 10/1927 | |
| JP | 2977228 | B2 | | 9/1999 | |
| WO | WO-9425807 | A1 | * | 11/1994 | ............ H02K 5/128 |
| WO | WO-2012072609 | A2 | * | 6/2012 | ............ H02K 11/33 |
| WO | 2017/108572 | A1 | | 6/2017 | |
| WO | 2021/167288 | A | | 8/2021 | |
| WO | WO-2021167288 | A1 | * | 8/2021 | ............ F04C 29/124 |

* cited by examiner

REFRIGERANT COMPRESSOR WITH A MOTOR ROTOR AND STATOR SEPARATED BY A SEPARATING CAN

This application is a National Stage Application of International Patent Application No. PCT/EP2022/081662, filed Nov. 11, 2022, which claims benefit of priority to German Patent Application No. 102021134268.6, filed on Dec. 22, 2021, which applications are incorporated herein by reference in their entirety. To the extent appropriate, a claim of priority is made to each of the above disclosed applications.

The invention relates to a refrigerant compressor for mobile applications. Furthermore, the invention relates to a vehicle, in particular a battery-powered electric vehicle or fuel cell vehicle with such a refrigerant compressor.

For example, a refrigerant compressor of the type mentioned at the outset is known from WO 2017/108572 A1. The well-known refrigerant compressor is intended for use in a motor vehicle and comprises a housing with a compressor section and a motor section. Variable compression chambers are formed in the compressor section, with which a refrigerant flowing through a working medium circuit can be compressed. The well-known refrigerant compressor is driven by a brushless electric motor located in the motor section. The electric motor comprises a stator and a rotor, wherein the rotor is connected to the compressor section. In the case of generic refrigerant compressors, it is common practice to dissipate the waste heat generated by the electric motor during operation by passing the refrigerant through the motor section before it is fed into the compressor section. The refrigerant flows through a gap between the stator and the rotor and absorbs the heat generated in the electric motor. The electric motor is cooled in this way.

The refrigerants used in refrigerant compressors usually contain oils or other flammable components. With previous refrigerant compressors, this is largely unproblematic because such refrigerant compressors are operated with low voltages of usually 24 volts or 48 volts. However, in the context of new generations of vehicles, particularly in battery-powered electric vehicles or fuel cell vehicles, high-voltage systems are used that are designed for voltages of 400 volts or 800 volts. At such high voltages, correspondingly higher demands are placed on the insulation of electrical components. Otherwise, there is a risk that the refrigerant is ignited by sparks, particularly in the case of refrigerant compressors. In this respect, there is an effort to isolate live parts from the refrigerant flow as effectively as possible.

The object of the invention is therefore to specify a refrigerant compressor for mobile applications which has improved electrical insulation, in particular in such a way that the refrigerant compressor can be operated safely in the vicinity of high-voltage systems with at least 400 volts. In addition, it is the object of the invention to specify a vehicle with such a refrigerant compressor.

According to the invention, this problem is solved by means of the refrigerant compressor herein and by means of the vehicle herein.

Thus, the invention is based on the idea of specifying a refrigerant compressor for mobile applications comprising a compressor section and motor section, wherein variable compression chambers are formed in the compressor section to receive and compress a refrigerant flowing through a working medium circuit. A brushless electric motor is arranged in the motor section, which comprises a stator and a rotor that is drive-connected to the compressor section.

According to the invention, the stator and the rotor are separated from each other by a separating can in a fluid-tight and/or gas-tight manner.

In a brushless electric motor, the stator comprises windings that are current is supplied to. In order to separate these energized elements from the compressor section electrically, the separating can is provided. This separates the stator from the rotor in a fluid-tight manner, thus forming an additional barrier between electrically current components and the refrigerant, which at least flows through the compressor section.

In a preferred embodiment of the invention, the refrigerant compressor is a reciprocating piston compressor or a rotary piston compressor. In particular, it may be provided that the refrigerant compressor is a scroll compressor, wherein the scroll compressor comprises an orbiting displacement spiral and a counter spiral in the compressor section, which engage into one another in such a way that the variable compression chambers are formed between the positive displacement spiral and the counter spiral. Scroll compressors have particular advantages for mobile applications and are therefore preferred for air conditioning systems in passenger vehicles.

The separating can may preferably separate a suction chamber, in which the stator is arranged, from a counter-pressure chamber in a fluid-tight and/or gas-tight manner. In the case of the refrigerant compressor according to the invention, the suction chamber is preferably not flowed through with refrigerant, as is provided for cooling the electric motor in prior art. In the case of scroll compressors, it is expedient if a counter-pressure chamber is arranged on one side of the displacement spiral opposite the counter spiral. Pre-compressed refrigerant can be fed into the counter-pressure chamber via an appropriate channel to ensure that the compressor spiral is pressed against the counter spiral. The pressure in the counter-pressure chamber thereby ensures an improved seal between the compressor spiral and the counter spiral. The counter-pressure chamber is usually formed in the motor section, wherein the separating can in the refrigerant compressor according to the invention favourably ensures that no fluid exchange takes place between the counter-pressure chamber and the suction chamber. In this respect, the suction chamber is hermetically separated from the counter-pressure chamber.

Specifically, the separating can may extend through an air gap between the stator and the rotor. In particular, it is intended that the separating can encapsulates the rotor and thus separates it from the stator, which comprises the energized coils, in a fluid-tight and gas-tight manner. In order to achieve good insulation and not affect the electric motor, a preferred embodiment of the invention provides that the separating can comprises or consists of a non-magnetic material. The non-magnetic material can comprise or be made of plastic, stainless steel, aluminium or carbon fibre in particular. The use of plastic or carbon fibre or carbon fibre composite material is preferred for applications where the weight of the refrigerant compressor is intended to be low.

In order to avoid an interaction between the electrically current components the refrigerant compressor, in particular, the stator, the refrigerant, it and is preferable that the working medium circuit comprises a compressor feed that flows directly into the compressor section, in particular, directly from outside the refrigerant compressor. In contrast to prior art, the refrigerant is not fed into the compressor section via the motor section but is introduced directly into the compressor section. This increases the distance between the channels carrying the refrigerant and the stator, further reducing the risk of interaction between the working medium circuit and the stator.

In general, it may also be provided that the electric motor of the refrigerant compressor according to the invention can be cooled by a cooling device which is externally connected to the motor section. Specifically, the motor section may have a motor housing that is connected or equipped with a cooling device. The cooling device can be, for example, a coolant circuit that is in contact with the motor housing or comprises cooling channels formed in the motor housing. The coolant circuit is preferably separate from the working medium circuit. In particular, the coolant circuit and the working medium circuit are preferably separated from each other by fluid technology. Thermal coupling may be provided, for example, to transfer thermal energy from the cooling medium to the refrigerant. For example, heat exchangers can be used for this purpose. A suitable separation between a cooling medium circuit and the working medium circuit is described in the applicant's German patent application entitled "Ververdrängerrmachine nach dem Spiralprinzip" (Positive displacement machine according to the spiral principle), which was filed on the same day.

In order to achieve good heat dissipation from the windings of the stator to the motor housing, a preferred variant of the invention provides that the stator comprises windings on whose winding heads stator heads connected to a motor housing are cast. In this respect, the stator heads form a thermal conductive element that proficiently transfers heat generated in the windings to the motor housing via the winding heads. The motor housing can then release this heat passively via the ambient air or, preferably, via an active cooling device.

In order to create a good hermetic seal between the stator and the rotor, it is particularly preferred if the separating can comprises a bearing receptacle in which a bearing of a drive shaft is fitted. The drive shaft is preferably connected to the rotor in a torque-proof manner. In order to completely encapsulate the rotor from the stator, it is favourable if the separating can also surrounds the drive shaft at its axial end. This is particularly favourable if a bearing for the drive shaft is fitted in the separating can, i.e., the separating can also comprises the axial bearing of the drive shaft.

The separating can may also be tightly connected to a centre plate that separates the motor section from the compressor section. In particular, the centre plate can be part of the entire housing of the refrigerant compressor. Preferably, the centre plate is respectively sealed by means of a seal from the motor section, particularly a motor housing, and the compressor section, particularly a compressor housing. In this way, a good and complete sealing of a space enclosing the rotor is achieved. The rotor is thus hermetically separated from its environment, particularly the stator.

In this respect, the centre plate may be located between the motor housing and the compressor housing. In general, it can be provided that the motor section comprises a motor housing and the compressor section comprises a compressor housing. The centre plate is preferably located between the motor housing and the compressor housing, particularly clamped between them. This creates a good seal and, simultaneously, a high level of maintenance ease. Because the centre plate extends between the motor housing and the compressor housing, the compressor housing can be removed for maintenance purposes without affecting the hermetic separation between rotor and stator by the separating can.

A secondary aspect of the invention relates to a vehicle, in particular a battery-powered electric vehicle or fuel cell vehicle, with a refrigerant compressor described above.

The vehicles described here are preferably multi-track passenger vehicles.

Figure 2:
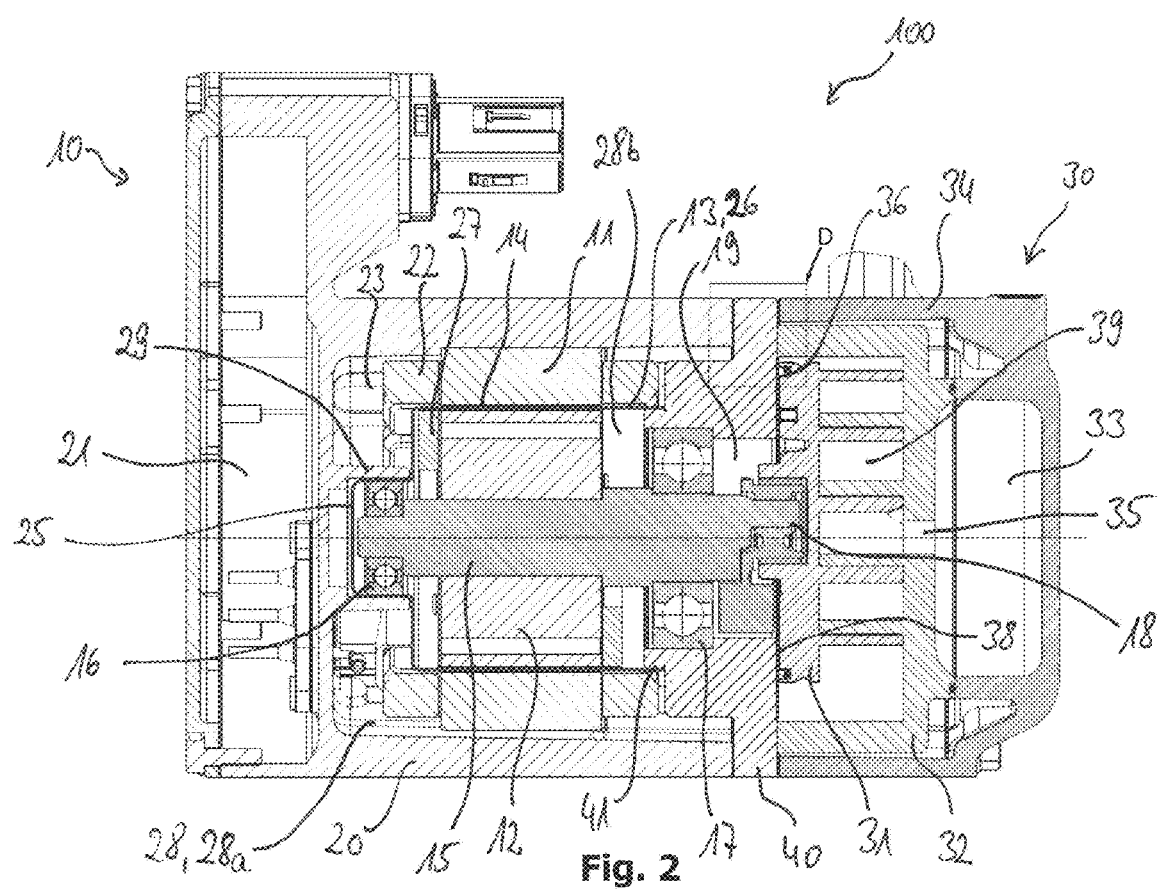
Figure 3:
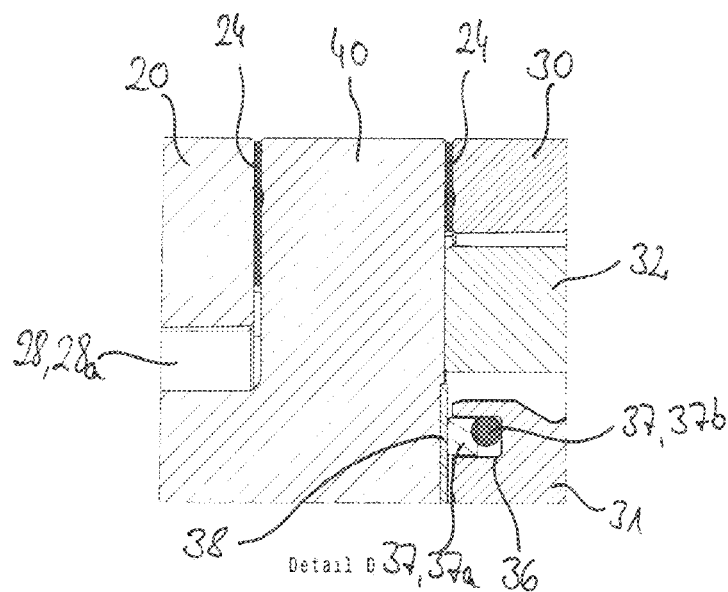

The invention is explained in more detail below by means of an exemplary embodiment with reference to the enclosed schematic drawings. The figures show:

FIG. 1 an exploded view of a part of a refrigerant compressor according to the invention in accordance with a preferred exemplary embodiment;

FIG. 2 a sectional view of the refrigerant compressor in accordance with FIG. 1;

FIG. 3 a detail from FIG. 2; and

Figure 4:
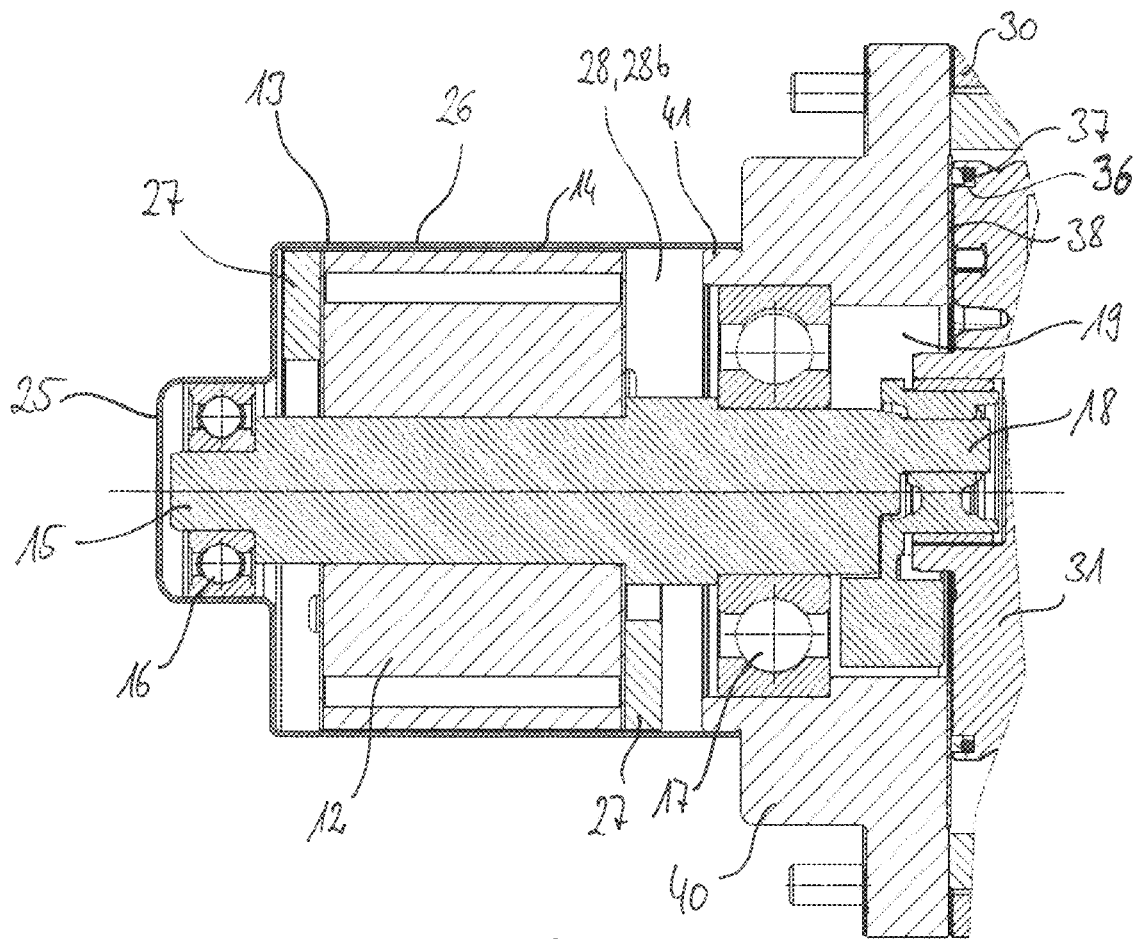

FIG. 4 a partial sectional view of the refrigerant compressor in accordance with FIG. 1.

FIG. 1 shows a section of a refrigerant compressor 100, which comprises a motor section 10 and a compressor section 30. The motor section 10 is shown open, wherein, in particular, rotor 12 of an electric motor can be recognized. The rotor 12 is connected to a drive shaft 15 in a torque-proof manner, which is mounted on a cup-side bearing 16. In the exploded view in accordance with FIG. 1, a separating can 13 can also be seen, which comprises a bearing receptacle 25. The bearing receptacle 25 is designed in such a way that the can-side bearing 16 can be fitted into it. The bearing receptacle 25 is designed as a single piece with a rotor receptacle 26. The rotor receptacle 26 and the bearing receptacle 25 each comprise a cylindrical contour, wherein the cross-sectional diameter of the rotor receptacle 26 is larger than the cross-sectional diameter of the bearing receptacle 25. Rotor receptacle 26 completely accommodates the rotor 12 when assembled.

On an axial end of the drive shaft 15 opposite the cup-side bearing 16, a compressor-side bearing 17 is recognizable, which is fixed in a centre plate 40. The centre plate 40 separates motor section 10 from compressor section 30. Preferably, the centre plate 40 is firmly connected to a compressor housing 34 of compressor section 30.

FIG. 2 shows a cross-section of the refrigerant compressor 100. The refrigerant compressor comprises a motor section 10, which comprises a motor housing 20. An inverter compartment 21 is arranged on the motor housing 20, which accommodates electronic components of an inverter, which is used to control the stator. The inverter compartment 21 is separated from a motor compartment 28. An electric motor is arranged in motor compartment 28, which comprises a stator 11 with windings 22. Windings 22 comprise winding heads 23, on which stator heads are preferably cast and connected to the motor housing.

The electric motor also comprises the rotor 12, which is arranged coaxially to the stator 11. An air gap 14 is formed between the rotor 12 and the stator 11, through which the separating can 13, in particular, its rotor receptacle 26, extends. The separating can 13 divides the motor compartment 28 into a suction chamber 28a, which contains the stator 11, and a drive chamber 28b, in which the rotor 12 and the drive shaft 15 are arranged. The bearing receptacle 25 of the separating can 13, which accommodates the can-side bearing 16 of the drive shaft 15, is fixed in an axial bracket 29 of the motor housing 20. The separating can 13 extends beyond the rotor 12 and extends to the centre plate 40. The centre plate 40 comprises an annular attachment 41 which projects into the separating can 13, in particular, the rotor receptacle 26, and causes a sealing connection between the separating can 13 and the centre plate 40. The centre plate 40 also accommodates the compressor-side bearing 17, which carries the drive shaft 15. The drive shaft 15 extends through the compressor-side bearing 17 and ends in an eccentric guide 18, which engages into the displacement spiral 31 of compressor section 30.

The compressor section 30 also comprises a compressor housing 34, which is connected to the centre plate 40. Specifically, the centre plate 40 is arranged between the compressor housing 34 and the motor housing 20.

The displacement spiral 31 and a counter spiral 32 are arranged in the compressor section 30 The displacement spiral 31, which can be moved orbitally from the drive shaft 15 via the eccentric guide 18, engages into the counter spiral 32. By means of the displacement spiral 31 engaging into the counter spiral 32, at least one variable compression chamber 39 is formed, the volume of which changes with the orbiting motion of the displacement spiral 31. A refrigerant flows through compression chamber 39, which is compressed by the change in volume of compression chamber 39 and directed at increased pressure through the central outlet opening 35 into a high-pressure chamber 33. From high-pressure chamber 33, the refrigerant enters the working medium circuit via a corresponding outlet.

FIG. 3 shows in detail the connection of the compressor housing 30 to the motor section 10. In particular, between the motor housing 20 and the compressor housing 34, the centre plate 40 is arranged. A seal 24 is arranged between the centre plate 40 and the motor housing 20 and between the centre plate 40 and the compressor housing 34, which ensures an outward hermetic seal of the entire refrigerant compressor 100. The seal 24 is preferably fluid-tight and/or gas-tight.

A further seal between the centre plate 40 and the compressor section 30 is carried out specifically between the centre plate 40 and the displacement spiral 31. For this purpose, the centre plate 40 comprises a sliding plate 38 in an area that is swept over by the orbiting movement of the displacement spiral 31. The displacement spiral 31 comprises a sealing groove 36, in which a sliding seal 37 is arranged. The sliding seal 37 comprises a sliding element 37a and a pressure element 37b. The sliding element 37a slides over the sliding plate 38 and is pressed against the sliding plate 38 by the pressure element 37. The pressure element 37b, for example, can comprise an elastic material for this purpose. For example, the pressure element 37 can be designed as an O-ring.

In FIG. 4, the hermetic sealing of the rotor by the separating can 13 is again illustrated, wherein the stator-side components of the refrigerant compressor 100 have been dispensed with for reasons of clarity. It is easy to see that the separating can 13 is fluid-tight and firmly connected to the centre plate 40, particularly its annular attachment 41. The separating can 13, in particular, the rotor receptacle 26, extends over the rotor 12 and also comprises the counterweight 27. The rotor receptacle 26 merges into the bearing receptacle 25, which completely encloses the cup-side bearing 16 and also extends over the axial end face of the drive shaft 15. In this way, the entire rotor assembly is hermetically sealed from the stator assembly.

In FIG. 4 the counter-pressure chamber 19 is also clearly recognizable, which is arranged between the compressor side bearing 17 and the displacement spiral 31. The counter-pressure chamber 19 is arranged within the drive chamber 28b, which is hermetically separated from the stator-side components of the refrigerant compressor 100, specifically from the suction chamber 28a, via the separating can 13.

REFERENCE LIST 100 refrigerant compressors
10 motor section
11 stator
12 rotor
13 separating can
14 air gap
15 drive shaft
16 can-side bearing
17 compressor-side bearing
18 eccentric guide
19 counter-pressure chamber
20 motor housing
21 inverter compartment
22 winding
23 winding head
24 seal
25 bearing receptacle
26 rotor receptacle
27 counterweight
28 motor compartment
28a suction chamber
28b drive compartment
29 axial bracket
30 compressor section
31 displacement spiral
32 counter spiral
33 high-pressure chamber
34 compressor housing
35 central outlet opening
36 sealing groove
37 sliding seal
37a sliding element
37b pressure element
38 sliding plate
39 compression chamber
40 centre plate
41 annular attachment

The invention claimed is:

1. A refrigerant compressor for mobile applications, comprising a compressor section and a motor section, wherein variable compression chambers are formed in the compressor section to receive and compress a refrigerant flowing through a working medium circuit, and wherein a brushless electric motor comprising a stator and a rotor that is drive-connected to the compressor section is arranged in the motor section,
   wherein the stator and the rotor are separated from each other by a separating can in a fluid-tight and/or gas-tight manner, the separating can separates a suction chamber in which the stator is arranged from a counter-pressure chamber in a fluid-tight and/or gas-tight manner.

2. The refrigerant compressor according to claim 1,
   wherein the refrigerant compressor is a reciprocating piston compressor, a rotary piston compressor or a scroll compressor, wherein the scroll compressor in the compressor section comprises an orbiting displacement spiral and a counter spiral that engage into one another in such a way that the variable compression chambers are formed between the displacement spiral and the counter spiral.

3. The refrigerant compressor according to claim 1,
   wherein the separating can extends through an air gap between the stator and the rotor.

4. The refrigerant compressor according to claim 1,
   wherein the separating can comprises a non-magnetic material.

5. The refrigerant compressor according to claim 4, wherein the non-magnetic material comprises or is made of plastic, stainless steel, aluminium or carbon fibre.

6. The refrigerant compressor according to claim 1, wherein the working medium circuit comprises a compressor feed which flows directly into the compressor section.

7. The refrigerant compressor according to claim 1, wherein the electric motor is cooled by a cooling device which is externally connected to the motor section.

8. The refrigerant compressor according to claim 1, wherein the stator comprises windings on whose winding heads stator heads connected to a motor housing are cast.

9. The refrigerant compressor according to claim 1, wherein the separating can comprises a bearing receptacle into which a cup-side bearing of a drive shaft is fitted.

10. The refrigerant compressor according to claim 1, wherein the separating can is connected to a center plate which separates the motor section from the compressor section and which is each sealed by a seal from the motor section, and the compressor section.

11. The refrigerant compressor according to claim 10, wherein
the center plate is arranged between the motor housing and the compressor housing.

12. A vehicle,
comprising a refrigerant compressor according to claim 1.

13. The refrigerant compressor according to claim 1, wherein the separating can consists of a non-magnetic material.

14. A battery-powered electric vehicle or a fuel cell vehicle comprising a refrigerant compressor according to claim 1.

* * * * *